United States Patent [19]

Taylor

[11] 4,105,636

[45] Aug. 8, 1978

[54] PRODUCTION OF AROMATIC POLYETHERS

[75] Inventor: Ian Charles Taylor, Bengeo, England

[73] Assignee: Imperial Chemical Industries Limited, London, England

[21] Appl. No.: 814,667

[22] Filed: Jul. 11, 1977

[30] Foreign Application Priority Data

Jul. 28, 1976 [GB] United Kingdom .............. 31453/76

[51] Int. Cl.$^2$ .................. C08G 65/40; C08G 75/23
[52] U.S. Cl. .................................. 528/126; 528/125; 528/174; 528/175; 528/212; 528/218; 528/219
[58] Field of Search .................. 260/49, 47 R, 50, 61

[56] References Cited

U.S. PATENT DOCUMENTS

| | | | |
|---|---|---|---|
| 3,332,909 | 7/1967 | Farnham et al. | 260/47 |
| 3,941,748 | 3/1976 | King | 260/47 R |
| 4,009,149 | 2/1977 | King et al. | 260/49 |
| 4,010,147 | 3/1977 | Rose | 260/79.3 M |
| 4,036,815 | 7/1977 | Feasey et al. | 260/49 |

*Primary Examiner*—Lester L. Lee
*Attorney, Agent, or Firm*—Cushman, Darby & Cushman

[57] ABSTRACT

Aromatic polyethers are made by boiling an organic sulphoxide or sulphone solvent containing i) an equimolar mixture of a bisphenol and an aromatic dihalo compound or ii) a halophenol, in which dihalo compound or halophenol the halogen atoms are activated by ortho or para —$SO_2$— or —CO— groups, and an alkali metal carbonate with removal of the water produced by the reaction by distillation in the absence of an azeotrope forming solvent.

9 Claims, No Drawings

PRODUCTION OF AROMATIC POLYETHERS

This invention relates to the production of aromatic polyethers and in particular to the production of aromatic polyethers containing sulphone or ketone linkages.

It has been proposed in Canadian Pat. No. 847,963 to make such polymers by reacting a bisphenol and a dihalobenzenoid compound, or a halophenol, in which dehalobenzenoid compound or halophenol the halogen atoms are activated by —SO$_2$— or —CO— groups ortho or para thereto, with an alkali metal carbonate.

It is indicated in that specification that during the reaction an alkali metal becarbonate is formed which then decomposes with the evolution of water. It was stated that removal of this water was not necessary to produce a polymer, but was preferred in order to ensure the formation of high molecular weight polymer. To remove this water an axeotrope former such as toluene or chlorobenzene was added and the azeotrope former and water distilled off. Comparative examples showed that where an azeotrope former was used a polymer of considerably higher reduced viscosity was obtained than where the water was not removed.

In United Kingdom patent specification No. 1,264,900 a similar process is described, using potassium carbonate as the alkali metal carbonate, and the specification indicates that the necessity of using an azeotrope distillation step is avoided. In the Examples no steps are taken to remove water, but long reaction times, 24 hours, were utilised.

We have found that polymers of high molecular weight can be obtained in relatively short reaction times if the reaction mixture is boiled and the water is removed by distillation. Thus polymers of higher molecular weight can be obtained in a given time than when employing an azeotrope forming solvent.

Accordingly we provide a process for the production of an aromatic polyether comprising boiling an inert organic sulphoxide or sulphone solvent containing (i) a substantially equimolar mixture of (a) at least one bisphenol and (b) at least one dihalobenzenoid compound, or (ii) at least one halophenol, in which dihalobenzenoid compound or halophenol the halogen atoms are activated by —SO$_2$— or —CO— groups ortho or para thereto, and an alkali metal carbonate, the amount of said carbonate being such that there is at least one alkali metal atom for each phenol group present, and removing water by distillation in the absence of an azeotrope forming solvent.

Preferred bisphenols are hydroquinone and those bisphenols of formula

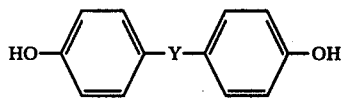

in which Y is a direct link, oxygen, sulphur, —SO$_2$—, —CO—, or a divalent hydrocarbon radical.

Particularly preferred bisphenols include 4,4'-dihydroxybenzophenone
4,4'-dihydroxydiphenylsulphone
2,2-bis-(4-hydroxyphenyl)propane
4,4'-dihydroxybiphenyl.

The dihalobenzenoid compounds preferably have the formula

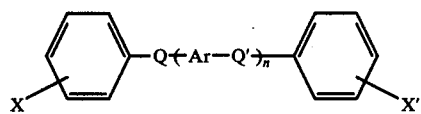

in which X and X', which may be the same or different, are halogen atoms and are ortho or para to the groups Q and Q', Q and Q', which may be the same or different, are —CO— or —SO$_2$—, Ar is a divalent aromatic radical, and $n$ is 0, 1, 2 or 3.

The aromatic radical Ar is preferably a divalent aromatic radical selected from phenylene, biphenylylene or terphenylylene, and diphenyl ether.

Particularly preferred dihalobenzenoid compounds include 4,4'-bis-(4-halophenylsulphonyl)diphenyl ethers, 4,4'-bis-(4-halobenzoyl)diphenyl ethers and dihalides having the formula

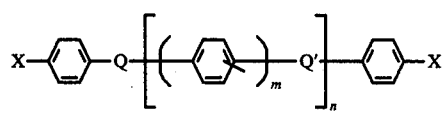

where $m$ is 1, 2 or 3.

Examples of suitable dihalobenzenoid compounds include 4,4'-dichlorodiphenylsulphone
4,4'-difluorodiphenylsulphone
4,4'-dichlorobenzophenone
4,4'-difluorobenzophenone
bis-4,4'-(4-chlorophenylsulphonyl)biphenyl
1,4-bis-(4-chlorobenzoyl)benzene
4,4'-bis-(4-chlorophenylsulphonyl)diphenyl ether
bis- 4'-(4-chlorophenylsulphonyl)biphenyl sulphone.

Mixtures of dihalobenzenoid compounds may be employed so as to produce copolymers. Examples of mixtures that may be employed include 4,4'-dichlorodiphenylsulphone with 4,4'-dichlorobenzophenone or bis-4'-(4-chlorophenyl sulphonyl)biphenyl.

Preferred halophenols are those of formula

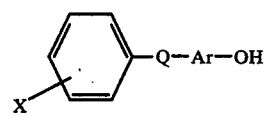

where X is halogen and is ortho or para to Q, Q is —SO$_2$— or —CO—, and Ar is an aromatic radical.

The aromatic radical Ar is preferably a divalent aromatic radical selected from phenylene, biphenylylene, and radicals of the formula

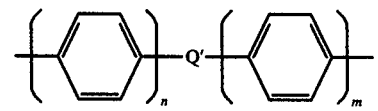

where Q' is —CO— or —SO$_2$— and $n$ and $m$, which may be the same or different, are integers selected from 1, 2 and 3.

particularly preferred halophenols have the formula

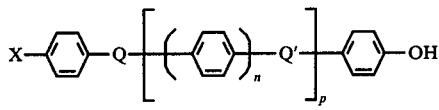

where $p$ is 0 or 1.

Examples of suitable halophenols include 4-(4chlorophenylsulphonyl)phenol
4-(4-fluorophenylsulphonyl)phenol
4-(4-chlorobenzoyl)phenol
4-hydroxy-4'-(4-chlorophenylsulphonyl)biphenyl
4-(4-hydroxyphenylsulphonyl)-4'-(4-chlorophenyl sulphonyl)biphenyl.

Mixtures of halophenols may be employed so as to produce copolymers. Examples of mixtures that may be employed include 4-(4-chlorophenylsulphonyl)phenol with 4-(4-chlorobenzoyl)phenol, 4hydroxy-4'-(4-chlorophenyl sulphonyl)biphenyl, or 4-(4-hydroxyphenylsulphonyl)-4'-(4-chlorophenylsulphonyl)biphenyl.

The solvent employed is an inert organic sulphoxide or sulphone of formula

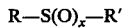

where $x$ is 1 or 2 and R and R' are alkyl or aryl groups and may be the same or different. R and R' may together form a divalent radical. Preferred solvents include dimethyl sulphoxide, dimethylsulphone, sulpholane (1,1 dioxothiolan), or aromatic sulphones of the formula

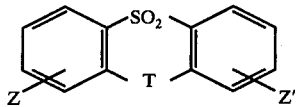

where T is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl.

The alkali metal carbonate is preferably potassium or sodium carbonate.

The alkali metal carbonate is preferably anhydrous although a hydrated carbonate may be employed if desired.

The amount of alkali metal carbonate required will depend on whether the reaction temperature is sufficiently high to decompose completely the alkali metal bicarbonate formed by reaction of the bisphenol or halophenol with the alkali metal carbonate. Potassium bicarbonate decomposes over the range of 100° to 200° C and rubidium and caesium bicarbonate decompose at 175° C. Sodium bicarbonate is somewhat more stable but does decompose in the manner indicated. Lithium bicarbonate does not decompose under any conditions. If little or no decomposition of the bicarbonate occurs then about 2 moles of alkali metal carbonate per mole of bisphenol (or at least 1 mole of alkali metal carbonate per mole of halophenol) should be used.

If however the temperature is sufficient to decompose the bicarbonate substantially completely, then the amount of alkali metal carbonate employed should be about 1 mole per mole of bisphenol or ½ mole per mole of halophenol. A slight excess (e.g. up to 10 mol % excess) of carbonate may be used. The use of larger amounts of alkali metal carbonate is undesirable as it may cause cleavage of the polymer produced — thus giving rise to low molecular weight and/or branched products. Thus use of too little alkali metal carbonate is undesirable as then only low molecular weight products may be obtained.

Where a bisphenol and dihalobenzenoid compound are employed, they should be used in substantially equimolar amounts. An excess of one over the other leads to the production of low molecular weight products. However a slight excess, up to 5 mol %, of dihalobenzenoid compound may be employed if desired.

The polymerisation temperature employed will depend on the nature of the reactants and the solvent, if any, employed. When using dimethyl sulphoxide the reaction temperature should be maintained at below 190° C, when using sulpholane the temperature should be maintained at below 300° C.

The reaction is preferably conducted under reduced pressure to maintain the reaction mixture boiling at the desired reaction temperature.

The polymerisation reaction may be terminated by mixing a suitable end stopping reagent, e.g. a mono or polyfunctional halide such as methyl chloride, t-butyl chloride or 4,4'-dihalodiphenylsulphone, with the molten reaction mixture.

In the reaction, alkali metal halide is produced as a byproduct. This can be removed by comminuting the reaction product and leaching out the alkali metal halide with a suitable solvent, e.g. water.

Polymers prepared by the process of the present invention are particularly suitable for use in applications where the polymer is liable to be subject to high service temperatures Examples of such applications include electrical insulation, e.g. wire coatings, electrical connector mouldings, and cookware coatings.

The invention is illustrated by the following Examples.

EXAMPLE 1

2,2-bis-(4-hydroxyphenyl)propane (22.831 g; 0.1 mol), 4,4'-dichlorodiphenylsulphone (28.719 g; 0.1 mol), anhydrous potassium carbonate (27.90 g; 0.202 mol) and dimethyl sulphoxide (400 ml) were charged to a flask which was fitted with stirrer, nitrogen inlet, thermocouple pocket and column, leading to a condenser and receiver, which was coupled to a vacuum system. The mixture was heated to 150° C by immersion in an oil bath at 190° C, during which time the apparatus was flushed with nitrogen. Once a temperature of 150° C was reached, the nitrogen flow was turned off and the system put under vacuum, the pressure being controlled by bleeding nitrogen into the apparatus downstream of the receiver. The pressure was adjusted to keep the mixture boiling at 150° C. Distillate was allowed to rise through the column, condense and run into the receiver. The amount of distillate was controlled at around 10 ml per hour by varying the heat input from the oil bath. The mixture was sampled every hour (which necessitated returning the apparatus to atmospheric pressure with nitrogen for a few minutes). The sample was worked up by pouring it into methanol and washing the resultant white material with boiling water (twice), boiling methanol (twice) and finally drying it at 90° C in an oven. The reduced viscosities (RV), measured at 25° C on a solution of the polymer in chloroform of concentration 0.2 g per 100 ml of solution, of the samples are shown in the Table below.

EXAMPLE 2

(Comparative Example Using Azeotropic Distillation)

2,2-bis-(4-hydroxyphenyl)propane (22.831 g; 0.1 mol), 4,4'-dichlorodiphenylsulphone (28.719 g; 0.1 mol), anhydrous potassium carbonate (27.90 g; 0.202 mol), dimethyl sulphoxide (400 ml) and toluene (80 ml) were charged to a flask fitted with a stirrer, nitrogen sparge, thermocouple pocket and Dean and Stark azeotropic distillation apparatus. The mixture was heated to 150° C and was held at 150° to 153° C with nitrogen sparging. Water was removed as an azeotrope with toluene. The mixture was sampled every hour. The samples were worked up as described in Example 1, and the reduced viscosities of the samples are shown in the Table below.

| Time at 150° C | RV | |
|---|---|---|
| (hours) | no azeotrope solvent | azeotrope solvent |
| 1 | 0.09 | — |
| 1.6 | — | 0.16 |
| 2 | 0.27 | — |
| 3 | 0.49 | 0.17 |
| 4 | 0.64 | 0.16 |
| 5 | 0.69 | 0.30 |
| 6 | 0.77 | 0.40 |

EXAMPLE 3

Example 1 was repeated, except the experiment was conducted at atmospheric pressure with no distillation, and nitrogen was sparged through the mixture. The mixture was sampled after 7 and 24 hours. The samples were worked up as described in Example 1. The reduced viscosities of the resulting polymers were as follows.

| Time sample taken (hours) | RV |
|---|---|
| 7 | 0.23 |
| 24 | 0.52 |

EXAMPLE 4

4,4'-difluorodiphenylsulphone (38.3300 g; 0.1508 mol), 4,4'-dihydroxydiphenylsulphone (37.2417 g; 0.1488 mol), anhydrous potassium carbonate (41.88 g; 0.303 mol) and dimethyl sulphoxide (350 ml) were charged to apparatus as described in Example 1. The mixture was heated to 160° C with nitrogen purging, and the pressure was controlled to maintain the mixture boiling at 160° C. The heat input to the vessel was adjusted to give a distillation rate of about 10 ml/hour. The mixture was sampled after 3 hours, and after 6 hours the apparatus was returned to atmospheric pressure with nitrogen and allowed to cool. At 70° C methyl chloride was introduced to end-cap the reactive chains. The reaction mixture and the sample were worked up as described in Example 1. The reduced viscosity (measured at 25° C on a solution of the polymer in dimethyl formamide of concentration 1 g in 100 ml of solution) of the sample after 3 hours was 0.37, and of the final product 0.36.

I claim:

1. A process for the production of an aromatic polyether comprising boiling an inert organic sulphoxide or sulphone solvent containing (i) a substantially equimolar mixture of (a) at least one bisphenol and (b) at least one dihalobenzenoid compound, or (ii) at least one halophenol, in which dihalobenzenoid compound or halophenol the halogen atoms are activated by —SO$_2$— or —CO— groups ortho or para thereto, and an alkali metal carbonate, the amount of said carbonate being such that there is at least one alkali metal atom for each phenol group present, and removing water by distillation in the absence of an azeotrope forming solvent.

2. A process according to claim 1 wherein the polyether is made by condensation of a bisphenol and a dihalobenzenoid compound, the bisphenol being selected from hydroquinone and bisphenols of the formula

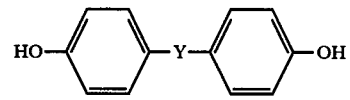

in which Y is a direct link, oxygen, sulphur, —SO$_2$—, —CO—, or a divalent hydrocarbon radical.

3. A process according to claim 1 wherein the polyether is made by condensation of a bisphenol and a dihalobenzenoid compound having the formula

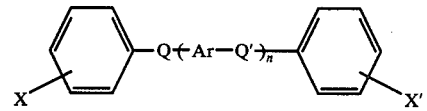

in which X and X', which may be the same or different, are halogen atoms and are ortho or para to the groups Q and Q'; Q and Q', which may be the same or different, are —CO— or —SO$_2$—; Ar is a divalent aromatic radical; and n is 0, 1, 2 or 3.

4. A process according to claim 1 wherein the polyether is made by condensation of a halophenol, the halophenol having the formula

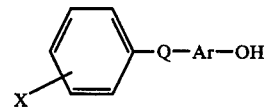

where X is halogen and is ortho or para to Q, Q is —SO$_2$— or —CO—, and Ar is an aromatic radical.

5. A process according to claim 1 wherein the solvent is an inert organic sulphoxide or sulphone of formula

where x or 2 and R and R' are alkyl or aryl groups and may be the same or different, and together may form a divalent radical.

6. A process according to claim 5 wherein the solvent is dimethyl sulphoxide and the reaction temperature is maintained below 190° C.

7. A process according to claim 5 wherein the solvent is sulpholane and the reaction temperature is maintained below 300° C.

8. A process according to claim 1 wherein the alkali metal carbonate is potassium or sodium carbonate.

9. A process according to claim 1 wherein the reaction is conducted under reduced pressure.

* * * * *